(12) United States Patent
Miyamoto

(10) Patent No.: US 12,510,671 B2
(45) Date of Patent: Dec. 30, 2025

(54) SURVEILLANCE SYSTEM, INFORMATION PROCESSING DEVICE, FALL DETECTION METHOD, AND NON-TRANSITORY COMPUTER READABLE MEDIUM

(71) Applicant: NEC Corporation, Tokyo (JP)

(72) Inventor: Shinichi Miyamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1003 days.

(21) Appl. No.: 17/437,659

(22) PCT Filed: Mar. 19, 2019

(86) PCT No.: PCT/JP2019/011469
§ 371 (c)(1),
(2) Date: Sep. 9, 2021

(87) PCT Pub. No.: WO2020/188748
PCT Pub. Date: Sep. 24, 2020

(65) Prior Publication Data
US 2022/0163671 A1 May 26, 2022

(51) Int. Cl.
*G01S 17/88* (2006.01)
*B61L 23/00* (2006.01)
(Continued)

(52) U.S. Cl.
CPC ............ *G01S 17/88* (2013.01); *B61L 23/007* (2013.01); *B61L 29/00* (2013.01); *G01S 17/86* (2020.01); *G06V 20/52* (2022.01); *G06V 40/103* (2022.01)

(58) Field of Classification Search
CPC .......... G01S 17/88; G01S 17/86; G06V 20/52; G06V 40/103; B61L 23/007; B61L 29/00
See application file for complete search history.

(56) References Cited

U.S. PATENT DOCUMENTS

| 8,115,641 B1 | 2/2012 | Dempsey |
| 2006/0145874 A1 | 7/2006 | Fredriksson et al. |

(Continued)

FOREIGN PATENT DOCUMENTS

| JP | 2004-210045 A | 7/2004 |
| JP | 2006-522959 A | 10/2006 |

(Continued)

OTHER PUBLICATIONS

International Search Report for PCT Application No. PCT/JP2019/011469, mailed on Jun. 25, 2019.
(Continued)

*Primary Examiner* — Michael D Lang

(57) ABSTRACT

Provided are a surveillance system, an information processing device, a fall detection method, and a non-transitory computer readable medium capable of improving the accuracy of detecting a person who has fallen down in a railroad crossing. A surveillance system according to the present disclosure includes a LiDAR sensor (10) that emits a plurality of laser beams with different ranges to a surveillance area, and outputs a detection signal indicating a detection status of an object by each of the laser beams, and an information processing device (20) that determines that the object has fallen down when the detection status by a laser beam with a shorter range than a predetermined range indicates that the object is detected and the number of laser beams detecting the object decreases.

6 Claims, 8 Drawing Sheets

(51) Int. Cl.
  *B61L 29/00*    (2006.01)
  *G01S 17/86*    (2020.01)
  *G06V 20/52*    (2022.01)
  *G06V 40/10*    (2022.01)

(56) References Cited

U.S. PATENT DOCUMENTS

2010/0063885 A1    3/2010  Merkin et al.
2012/0019387 A1    1/2012  Chiou et al.
2019/0318177 A1*  10/2019  Steinberg .............. G01S 7/4808

FOREIGN PATENT DOCUMENTS

| JP | 2012-027899 A | 2/2012 |
| JP | 2014-016742 A | 1/2014 |
| JP | 2015-182556 A | 10/2015 |
| JP | 2016-128977 A | 7/2016 |
| JP | 2016-155482 A | 9/2016 |
| WO | 2017/168043 A1 | 10/2017 |

OTHER PUBLICATIONS

Japanese Office Action for JP Application No. 2021-506893 mailed on May 24, 2022 with English Translation.

* cited by examiner

SURVEILLANCE SYSTEM, INFORMATION PROCESSING DEVICE, FALL DETECTION METHOD, AND NON-TRANSITORY COMPUTER READABLE MEDIUM

This application is a National Stage Entry of PCT/JP2019/011469 filed on Mar. 19, 2019, the contents of all of which are incorporated herein by reference, in their entirety.

TECHNICAL FIELD

The present disclosure relates to a surveillance system, an information processing device, a fall detection method, and a non-transitory computer readable medium.

BACKGROUND ART

A surveillance device that monitors a railroad crossing is used to reduce accidents in railroad crossings. The surveillance device detects a person inside a railroad crossing by using information obtained from a camera, a radar or the like.

Patent Literature 1 discloses the configuration of a crossing obstacle detection device capable of reliably detecting, as an obstacle, an object whose conditions such as height, area, or size has changed, which should be detected as an obstacle, in a railroad crossing. The crossing obstacle detection device disclosed in Patent Literature 1 outputs a transmission wave from a millimeter-wave radar sensor or the like toward an obstacle detection area, and detects the distance to an obstacle, the size of an obstacle and the like by using its reflected wave. Further, the obstacle detection device defines the output range of a transmission wave of millimeter-wave radar that centers on an antenna unit of the millimeter-wave radar sensor and covers the obstacle detection area in a railroad crossing.

CITATION LIST

Patent Literature

Patent Literature 1: Japanese Unexamined Patent Application Publication No. 2016-155482

SUMMARY OF INVENTION

Technical Problem

The transmission wave output from the crossing obstacle detection device disclosed in Patent Literature 1 needs to be output in a substantially horizontal direction to the ground so as to cover the obstacle detection area. As a result that the transmission wave is output in a substantially horizontal direction to the ground, the transmission wave reaches the area at the edge of the obstacle detection area. However, in the case where the transmission wave is output in a substantially horizontal direction to the ground, there is a problem that the transmission wave does not hit a person who has fallen down in a railroad crossing, and the person who has fallen down is thereby not detectable.

An object of the present disclosure is to provide a surveillance system, an information processing device, a fall detection method, and a non-transitory computer readable medium capable of improving the accuracy of detecting a person who has fallen down in a railroad crossing.

Solution to Problem

A surveillance system according to a first aspect of the present invention includes a LiDAR sensor configured to emit a plurality of laser beams with different ranges to a surveillance area, and output a detection signal indicating a detection status of an object by each of the laser beams, and an information processing device configured to determine that the object has fallen down when the detection status by a laser beam with a shorter range than a predetermined range indicates that the object is detected and the number of laser detecting the object decreases.

An information processing device according to a second aspect of the present invention includes a communication unit configured to receive, from a LiDAR sensor having emitted a plurality of laser beams with different ranges to a surveillance area, a detection signal indicating a detection status of an object by each of the laser beams, and a determination unit configured to determine that the object has fallen down when the detection status by a laser beam with a shorter range than a predetermined range indicates that the object is detected and the number of laser beams detecting the object decreases.

A fall detection method according to a third aspect of the present invention includes receiving, from a LiDAR sensor having emitted a plurality of laser beams with different ranges to a surveillance area, a detection signal indicating a detection status of an object by each of the laser beams, and determining that the object has fallen down when the detection status by a laser beam with a shorter range than a predetermined range indicates that the object is detected and the number of laser beams detecting the object decreases.

A program according to a fourth aspect of the present invention causes a computer to execute receiving, from a LiDAR sensor having emitted a plurality of laser beams with different ranges, a detection signal indicating a detection status of an object by each of the laser beams, and determining that the object has fallen down when the detection status by a laser beam with a shorter range than a predetermined range indicates that the object is detected and the number of laser beams detecting the object decreases.

Advantageous Effects of Invention

According to the present disclosure, there are provided a surveillance system, an information processing device, a fall detection method, and a non-transitory computer readable medium capable of improving the accuracy of detecting a person who has fallen down in a railroad crossing.

DESCRIPTION OF EMBODIMENTS

First Example Embodiment

Figure 1:
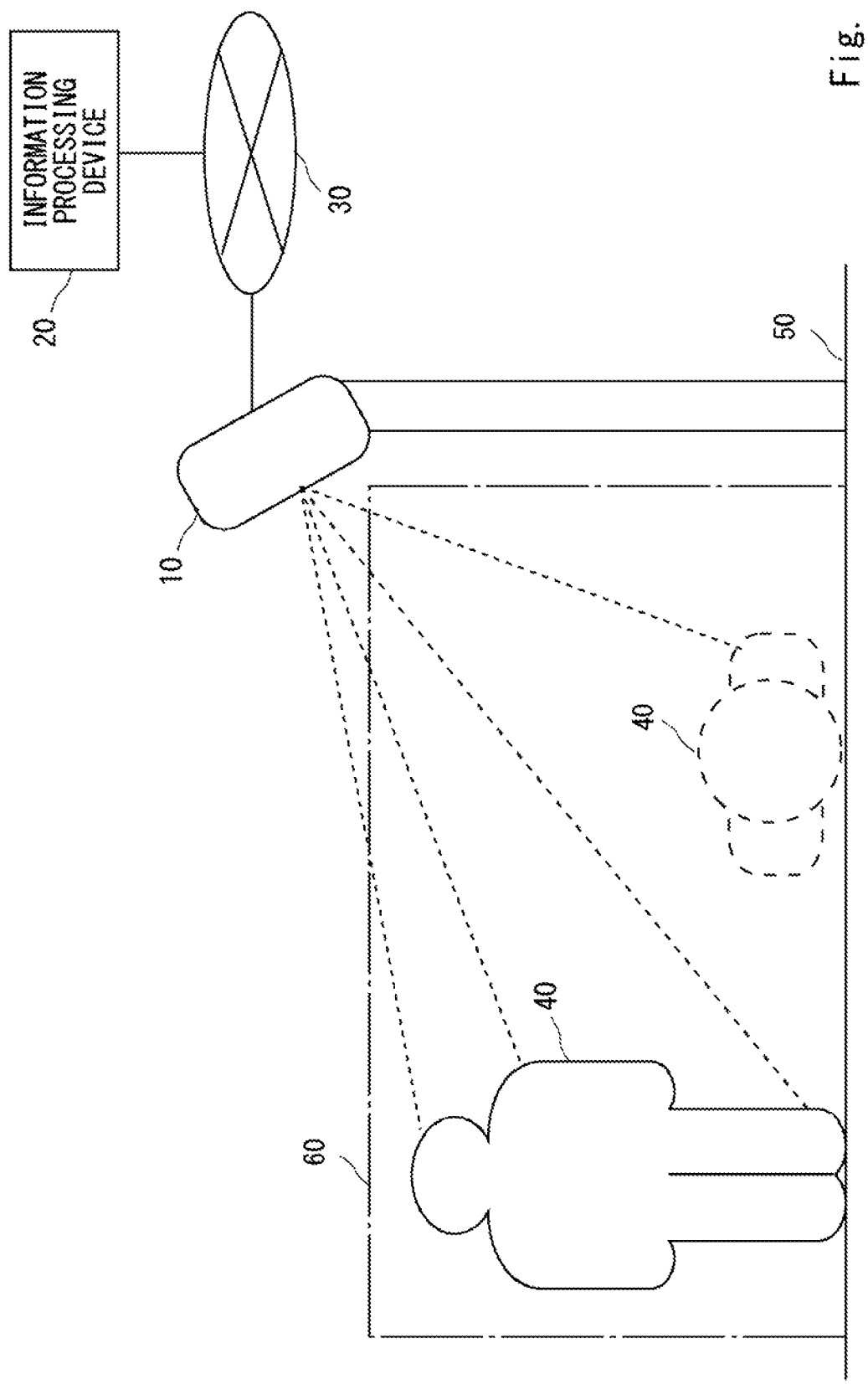
FIG. 1 is a block diagram of a surveillance system according to a first example embodiment.

Example embodiments of the present disclosure will be described hereinafter with reference to the drawings. A configuration example of a surveillance system according to a first example embodiment is described with reference to FIG. 1. The surveillance system in FIG. 1 is used mainly for monitoring the situation in a railroad crossing. To be specific, the surveillance system in FIG. 1 may be used for finding a person who has fallen down in a railroad crossing in a surveillance area 60.

The surveillance system includes a LiDAR (Light Detection and Ranging) sensor 10 and an information processing device 20. The LiDAR sensor emits a plurality of laser beams with different ranges to the surveillance area 60, and outputs a detection signal indicating the detection status of an object 40 by each laser beam. In FIG. 1, the state where an object 40 is walking and the state where the object 40 has fallen down are shown. The object 40 in the state of falling down is lower than the object 40 in the state of walking. The object 40 in the state of walking is represented by a solid line, and the object 40 in the state of falling down is represented by a dotted line.

The surveillance area 60 is a space on the earth's surface 50, and it may be a space including a railroad crossing, for example. Further, although the upper end of the surveillance area 60 is defined in FIG. 1, the upper end is not necessarily defined.

A plurality of laser beams with different ranges are such that each of laser beams has a different illumination angle from the other laser beams. The illumination angle may be determined by a plane parallel to the earth's surface 50 and the illumination direction of a laser beam. Alternatively, the illumination angle may be determined by a plane orthogonal to the earth's surface 50 and the illumination direction of a laser beam. The range may be the distance from the LiDAR sensor 10 to the reaching point of a laser beam on the earth's surface 50. Alternatively, the range may be the distance from the ground point of the LiDAR sensor 10 on the earth's surface 50 to the reaching point of a laser beam on the earth's surface 50.

A laser beam emitted from the LiDAR sensor 10 is scattered when it hits the object 40 and becomes reflected light. The reflected light is used for determining the presence or absence of the object 40 and for measuring the distance to the object 40. The LiDAR sensor 10 receives the reflected light, and then outputs a detection signal indicating the detection status of the object 40 to the information processing device 20. The detection status is the status indicating whether the object 40 is detected or not, for example. However, even when the LiDAR sensor 10 receives the reflected light, the LiDAR sensor 10 cannot determine whether the recognized object 40 is walking or falling down, and it only recognizes that the object 40 of some sort is detected.

The LiDAR sensor 10 may collectively set the detection status of the object 40 by each of the emitted laser beams to one signal, or may set the detection status to a signal different for each laser beam. Information indicating whether the object 40 is detected or not may be set to the detection signal, or information indicating whether the reflected light is received for each laser beam may be set to the detection signal.

The LiDAR sensor 10 transmits the detection signal to the information processing device 20 through a network 30. The network 30 may be an IP network, for example. To be specific, the network 30 may be the Internet, or an intranet, which is a closed network in a company or the like. Alternatively, the LiDAR sensor 10 and the information processing device 20 may directly communicate with each other by using a wired cable, near-field communication, or the like. The near-field communication may be a wireless LAN (Local Area Network) or Bluetooth (registered trademark), for example.

The information processing device 20 may be a computer device that operates when a processor executes a program stored in a memory. The information processing device 20 may be a server device, for example.

The information processing device 20 receives the detection signal from the LiDAR sensor 10. When the detection status by a laser beam with a shorter range than a predetermined range indicates that the object 40 is detected, and the number of laser beams that detect the object 40 decreases, the information processing device 20 determines that the object has fallen down.

For example, as shown in FIG. 1, it is assumed that the object 40 has been detected by three laser beams among the four laser beams emitted from the LiDAR sensor 10. After that, when the object 40 falls down, the object 40 lies at the position close to the earth's surface 50. In this case, the three laser beams with a long range, among the plurality of laser beams emitted from the LiDAR sensor 10, are unable to detect the object 40, and only the laser beam with the shortest range is able to detect the object 40. In this manner, when the number of laser beams that have detected the object 40 decreases, and further the laser beam with a short range detects the object 40, the LiDAR sensor 10 determines that the object 40 has fallen down.

Although FIG. 1 shows that only the laser beam with the shortest range among the four laser beams detects the object 40 that has fallen down, two laser beams with a short range among the four laser beams may detect the object 40 that has fallen down. A laser beam or laser beams to be used to determine that the object 40 has fallen down in the event that they detect the object 40 when the number of laser beams that have detected the object 40 decreases may be determined in advance.

As described above, the surveillance system in FIG. 1 uses detection results of the object by a plurality of laser beams with different ranges when determining whether the object 40 has fallen down or not. The plurality of laser beams with different ranges are at different angles from the earth's surface. This increases the probability that any of those laser beams hits the object that has fallen down compared with the case where a laser beam is emitted in parallel to the earth's surface. As a result, the information processing device 20 is able to determine whether the object 40 has fallen down or not by using detection results of the object 40 by a plurality of laser beams.

Second Example Embodiment

Figure 2:
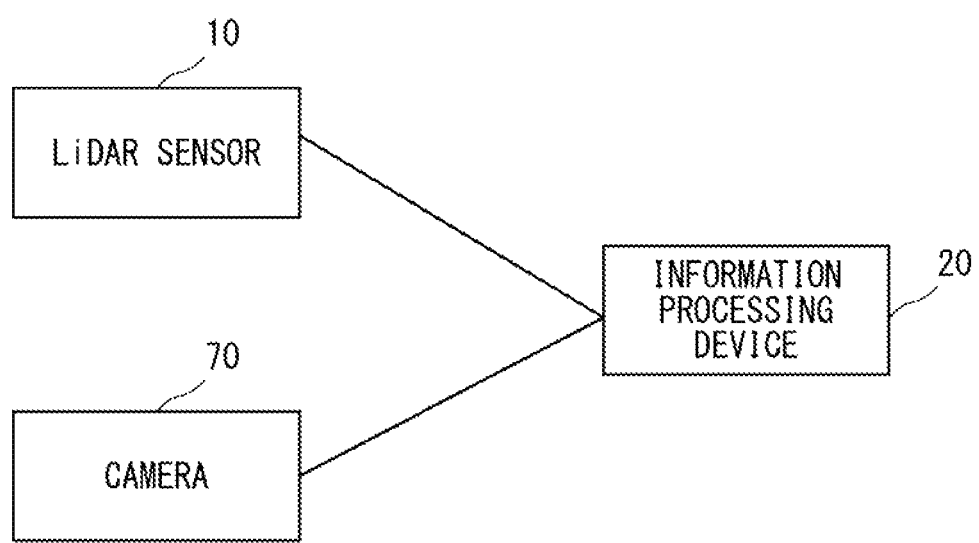
FIG. 2 is a block diagram of a surveillance system according to a second example embodiment.

A configuration example of a surveillance system according to a second example embodiment is described hereinafter with reference to FIG. 2. The surveillance system in FIG. 2 includes a LiDAR sensor 10, an information processing device 20, and a camera 70. The LiDAR sensor 10 and the information processing device 20 are the same as the LiDAR sensor 10 and the information processing device 20 described with reference to FIG. 1. The same functions and operations of the LiDAR sensor 10 and the information processing device 20 as those in FIG. 1 are not described in detail below.

The camera 70 is used to capture an image of the surveillance area 60. The camera 70 may be a far-infrared camera, a general digital camera or video camera, or the like.

The camera 70 transmits a captured image generated capturing an image of the surveillance area 60 to the information processing device 20. The camera 70 may transmit the captured image to the information processing device 20 through a network 30. Alternatively, the camera 70 may transmit the captured image to the information processing device 20 by using a wired cable, near-field communication, or the like.

Figure 3:
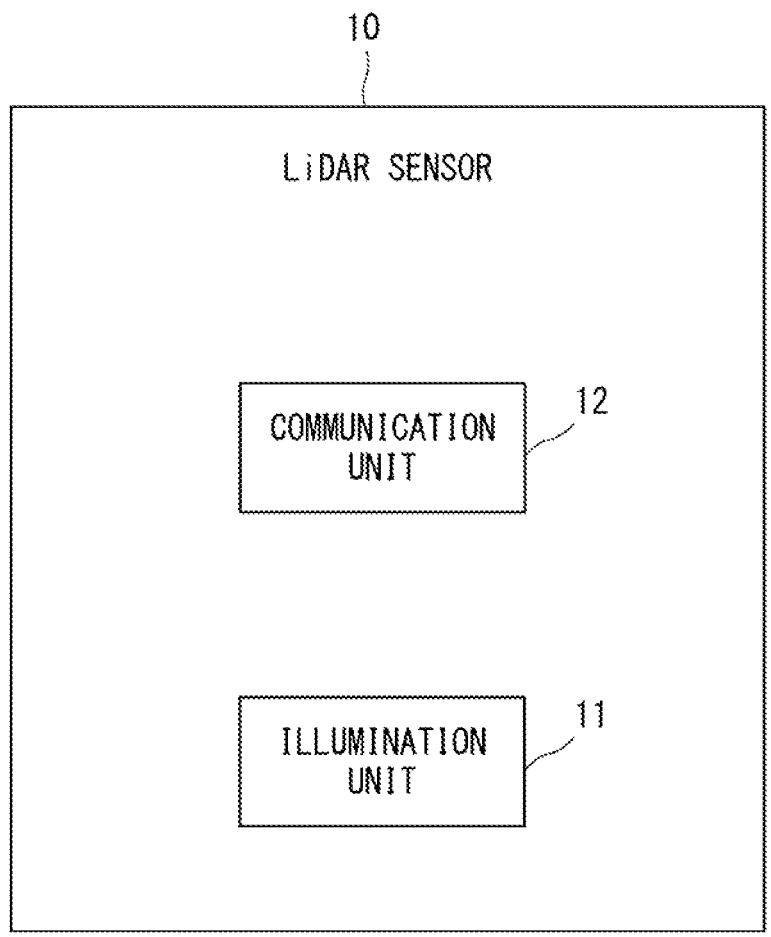
FIG. 3 is a block diagram of a LiDAR sensor according to the second example embodiment.

A configuration example of the LiDAR sensor 10 according to the second example embodiment is described hereinafter with reference to FIG. 3. The LiDAR sensor 10 includes an illumination unit 11 and a communication unit 12. The illumination unit 11 may emit laser beams and receive reflected light. The illumination unit 11 may be composed of an amplifier, an ADC (Analog-Digital Converter), a photodiode and the like. Stated differently, the illumination unit 11 is composed of a transmitter that emits laser beams and a receiver that receives reflected light, for example. The illumination unit 11 emits a plurality of laser beams with different illumination angles. The illumination unit 11 may emit a plurality of laser beams by changing the illumination direction of one transmitter, or may emit a plurality of laser beams by using a plurality of transmitters with fixed illumination direction, for example.

The illumination unit 11 outputs information indicating a laser beam whose reflected light is received among the emitted laser beams to the communication unit 12. The illumination unit 11 may determine that the object 40 exists in the illumination direction of the laser beam whose reflected light is received, for example. For example, it is assumed that the laser beams emitted from the LiDAR sensor 10 in FIG. 1 include laser beams in a first layer, a second layer, a third layer and a fourth layer sequentially in descending order of the range. In FIG. 1, the illumination unit 11 first outputs, to the communication unit 12, information indicating that the object 40 is detected by the laser beams in the first layer to the third layer. After the object 40 falls down, the illumination unit 11 outputs, to the communication unit 12, information indicating that the object 40 is detected by the laser beam in the fourth layer.

The communication unit 12 communicates with the information processing device 20 through the network 30. The communication unit 12 may be a network interface that performs data transmission and reception with the network 30, for example. The communication unit 12 transmits a detection signal containing information indicating a detection result of the object 40 to the information processing device 20. The information indicating a detection result of the object 40 may be information indicating in which layer of a laser beam the object 40 is detected, for example. The communication unit 12 may transmit the detection signal to the information processing device 20 each time receiving information from the illumination unit 11. Alternatively, the communication unit 12 may transmit the detection signal to the information processing device 20 at predetermined timing.

Figure 4:
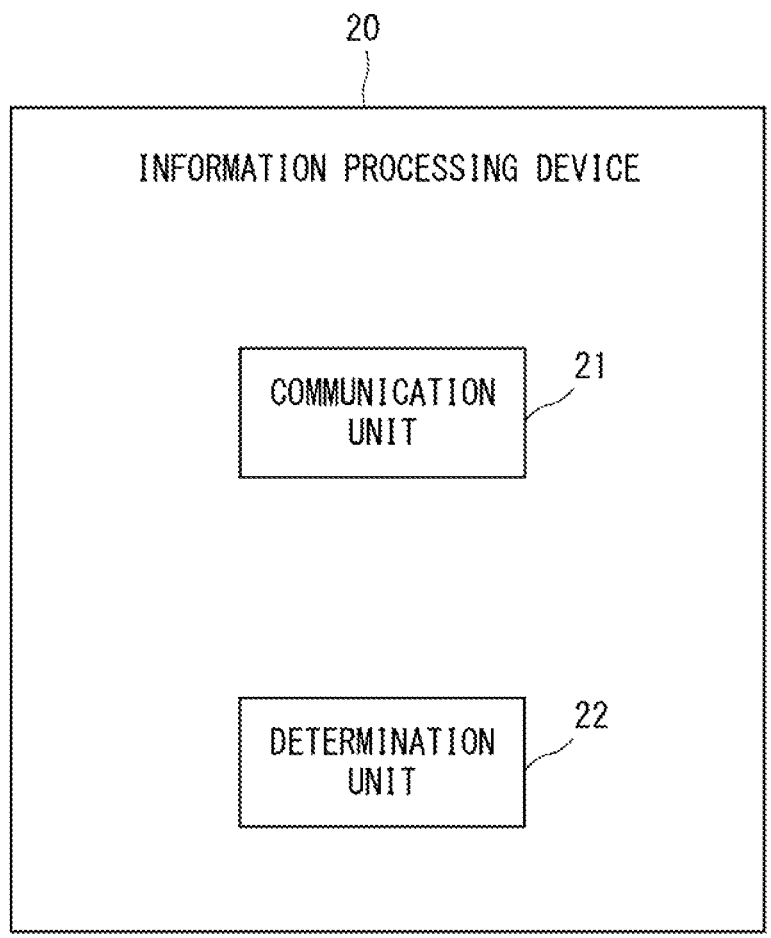
FIG. 4 is a block diagram of an information processing device according to the second example embodiment.

A configuration example of the information processing device 20 according to the second example embodiment is described hereinafter with reference to FIG. 4. The information processing device 20 includes a communication unit 21 and a determination unit 22. The communication unit 21 and the determination unit 22 may be software or module whose processing is performed when a processor executes a program stored in a memory. Alternatively, the communication unit 21 and the determination unit 22 may be hardware such as a circuit or a chip.

The communication unit 21 receives a captured image from the camera 70 and receives a detection signal from the LiDAR sensor 10, each through the network 30. The communication unit 21 outputs the received captured image and the detection signal to the determination unit 22.

Figure 5:
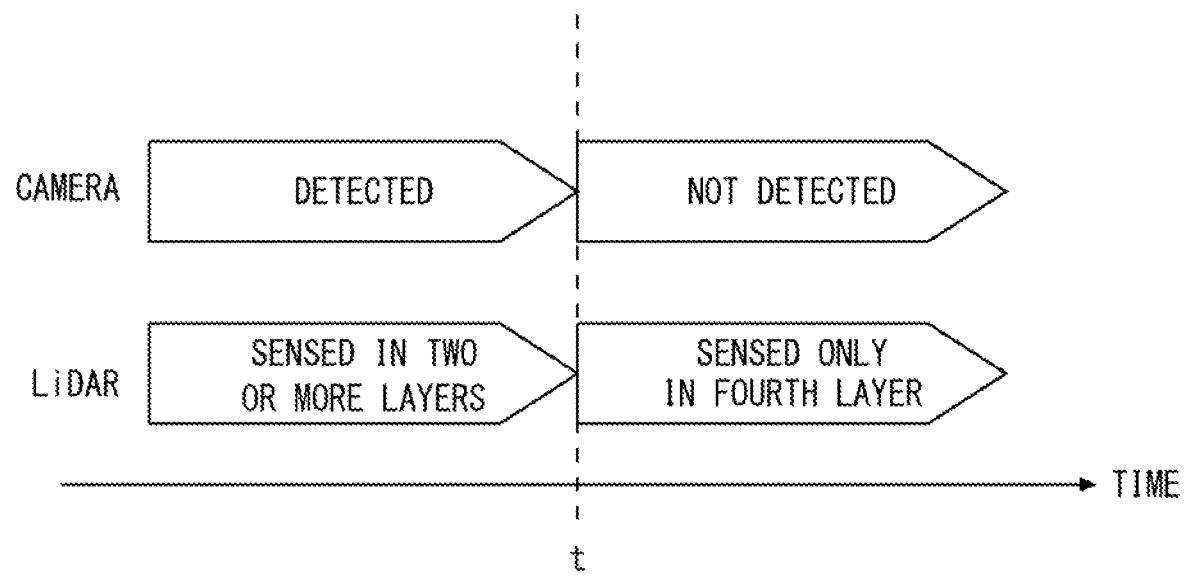
FIG. 5 is a view illustrating a determination as to whether there is a person who has fallen down according to the second example embodiment.

The determination unit 22 determines whether there is a person who is falling down in the surveillance area 60. A determination process by the determination unit 22 is described hereinafter with reference to FIG. 5. The determination unit 22 performs a process of detecting the object 40 in a captured image. For example, the determination unit 22 detects a pedestrian contained in the captured image by using a learning model that has learned using deep learning or the like. Each time receiving a captured image from the camera 70, the determination unit 22 performs a detection process of a pedestrian by using each captured image as input data of the learning mode. The case where the determination unit 22 is able to detect a pedestrian is when features of the pedestrian are shown in the captured image. On the other hand, the case where the determination unit 22 is unable to detect a pedestrian may be when the pedestrian has moved out of the surveillance area 60, for example. Alternatively, the case where the determination unit 22 is unable to detect a pedestrian may be when the pedestrian falls down and thereby features of the pedestrian are no longer shown in the captured image. Alternatively, the case where the determination unit 22 is unable to detect a pedestrian may be when the pedestrian is not distinguishable from the earth's surface 50 in the captured image taken using a far-infrared camera, for example. To be specific, there is a case where a pedestrian falls down and comes into contact with the earth's surface 50, and thereby a temperature difference between the pedestrian and the earth's surface 50 becomes small. In such a case, the pedestrian is sometimes not distinguishable from the earth's surface 50 in the captured image using a far-infrared camera.

Further, the determination unit 22 determines in which layer of a laser beam the object 40 is detected by the detection signal received from the LiDAR sensor 10. Further, the determination unit 22 determines whether the object 40 is detected by a plurality of laser beams.

For example, the determination unit 22 determines that whereas a pedestrian has been detected in the captured image at timing before time t, the pedestrian is no longer detected in the captured image at timing after time t. Further, the determination unit 22 determines that whereas the object 40 has been detected in a plurality of layers at timing before time t, the object 40 is detected only in the fourth layer at timing after time t.

Thus, the determination unit 22 becomes unable to detect the pedestrian in the captured image at time t, and further begins to detect the object 40, which has been detected in a plurality of layers, only in the fourth layer at time t. In this manner, in the case where the object 40 that has been detected in a plurality of layers becomes detected only in the fourth layer at the timing when the pedestrian becomes undetectable in the captured image, the determination unit 22 determines that there is a person who has fallen down. The determination unit 22 may determine that there is a person who has fallen down in the case where the timing when the pedestrian becomes undetectable in the captured image and the timing when the object 40 that has been detected in a plurality of layers becomes detected only in the fourth layer are substantially the same. The case where those timings are substantially the same includes the case where the timing when the pedestrian becomes undetectable in the captured image and the timing when the object 40 that has been detected in a plurality of layers becomes detected only in the fourth layer are within a predetermined range.

Further, the determination unit 22 may determine that the pedestrian and the object 40 are the same person in the case where the position of the pedestrian detected in the captured image and the position of the object 40 detected by the LiDAR sensor 10 coincide. Alternatively, the determination unit 22 may determine that the pedestrian and the object 40 are the same person in the case where the distance between the position of the pedestrian detected in the captured image and the position of the object 40 detected by the LiDAR sensor 10 is shorter than a predetermined distance. The position of the pedestrian detected in the captured image may be identified by converting the image coordinates or the camera coordinates into the world coordinates, for example. The image coordinates or the camera coordinates may be represented using the pixel position. The world coordinates may be represented using the latitude and the longitude, for example. The determination unit 22 may store table information indicating the correspondence between the image coordinates or the camera coordinates and the world coordinates in advance, for example.

As the position of the object 40 detected by the LiDAR sensor 10, a detection position when a laser beam in each layer detects the object 40 may be predetermined, for example. Alternatively, as the position of the object 40 detected by the LiDAR sensor 10, the distance from the LiDAR sensor 10 to the object 40 may be estimated according to the timing of receiving reflected light. Further, the determination unit 22 may estimate the position of the object 40 on the basis of the estimated distance.

Figure 6:
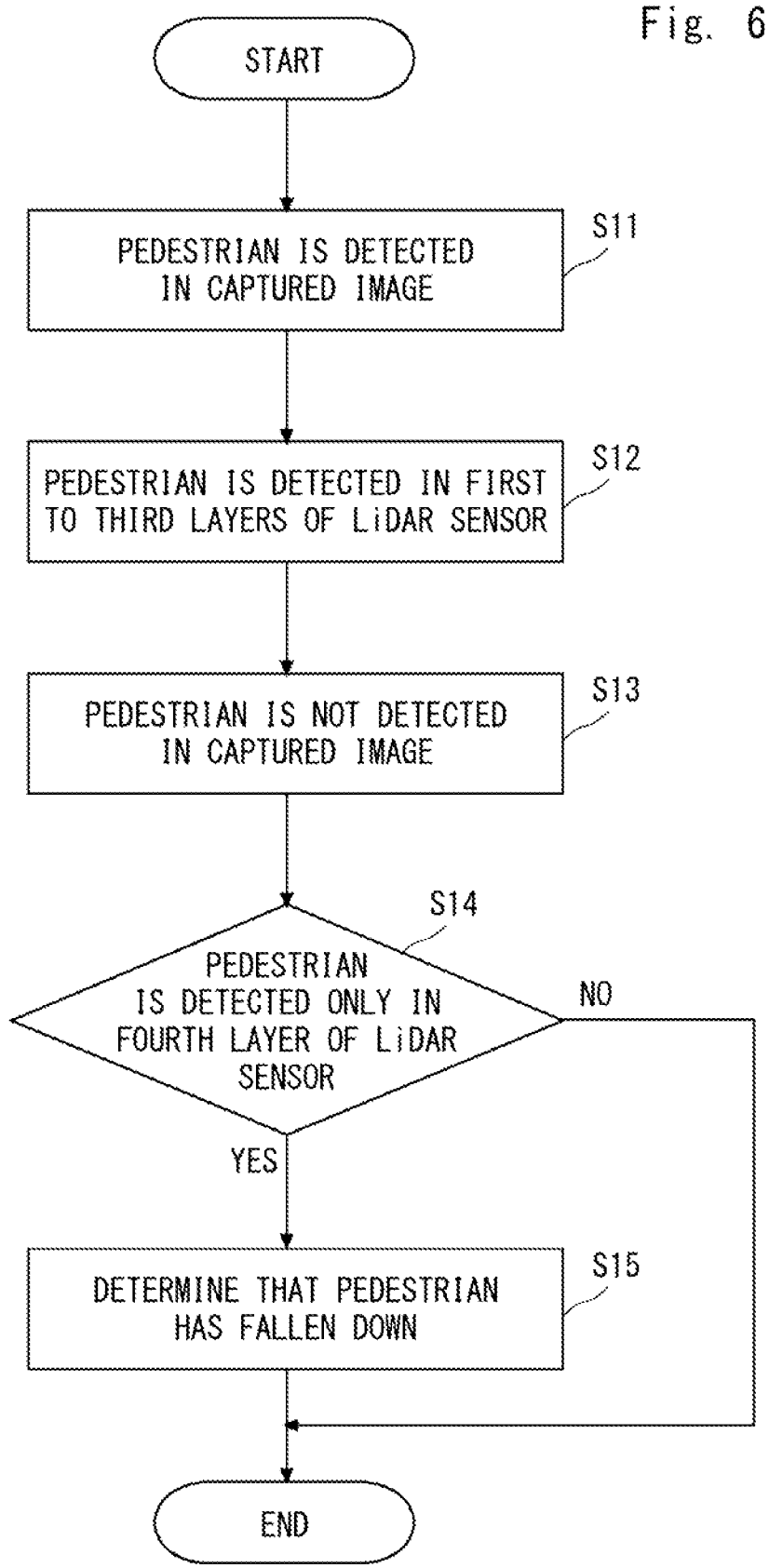
FIG. 6 is a view showing the flow of a process of detecting a person who has fallen down according to the second example embodiment.

The flow of a process of detecting a person who has fallen down according to the second example embodiment is described hereinafter with reference to FIG. 6. First, the determination unit 22 detects a pedestrian in the captured image (S11). The determination unit 22 detects a pedestrian in a captured image by performing machine learning such as deep learning, for example.

Next, the determination unit 22 determines that the object 40 is detected by the laser beams in the first layer to the third layer in the LiDAR sensor 10 (S12). The determination unit 22 determines the laser beams by which the object 40 is detected by using the detection signal received from the LiDAR sensor 10. After that, the determination unit 22 becomes unable to detect the pedestrian in the captured image (S13).

Then, the determination unit 22 determines whether the object 40 is detected only by the laser beam in the fourth layer in the LiDAR sensor 10 (S14). Alternatively, the determination unit 22 may determine whether the object 40 is detected only by the laser beam in a predetermined layer in the LiDAR sensor 10.

When the determination unit 22 determines that the object 40 is detected only by the laser beam in the fourth layer, it determines that the pedestrian has fallen down (S15). When, on the other hand, the determination unit 22 determines that the object 40 is detected by a laser beam in a layer different from the fourth layer or when the object 40 is not detected by any laser beam, the process ends.

As described above, the information processing device 20 according to the second example embodiment determines the presence or absence of a person who has fallen down by analyzing the detection status of the pedestrian in the captured image captured by the camera 70 and the detection status of the object 40 in the LiDAR sensor 10.

The plurality of laser beams emitted from the LiDAR sensor 10 have different angles from one another, and are applied to the surveillance area 60. This allows the LiDAR sensor 10 to detect the object 40 in the surveillance area 60 regardless of the height of the object 40.

Further, in order to detect the motion of a pedestrian who is falling down in the surveillance area 60, the information processing device 20 can use a change in the laser beam by which the pedestrian is detected in the LiDAR sensor 10 and a change in the detection status of the pedestrian in the captured image. The information processing device 20 is thereby able to detect that the pedestrian has fallen down.

Furthermore, the plurality of laser beams including those in the first to fourth layers emitted from the LiDAR sensor 10 may have their reaching points on the earth's surface 50 included in the surveillance area 60. By limiting the reaching points of the plurality of laser beams emitted from the LiDAR sensor 10 to the earth's surface 50 included in the surveillance area 60, detection of an object outside the surveillance area 60 is prevented.

Third Example Embodiment

Figure 7:
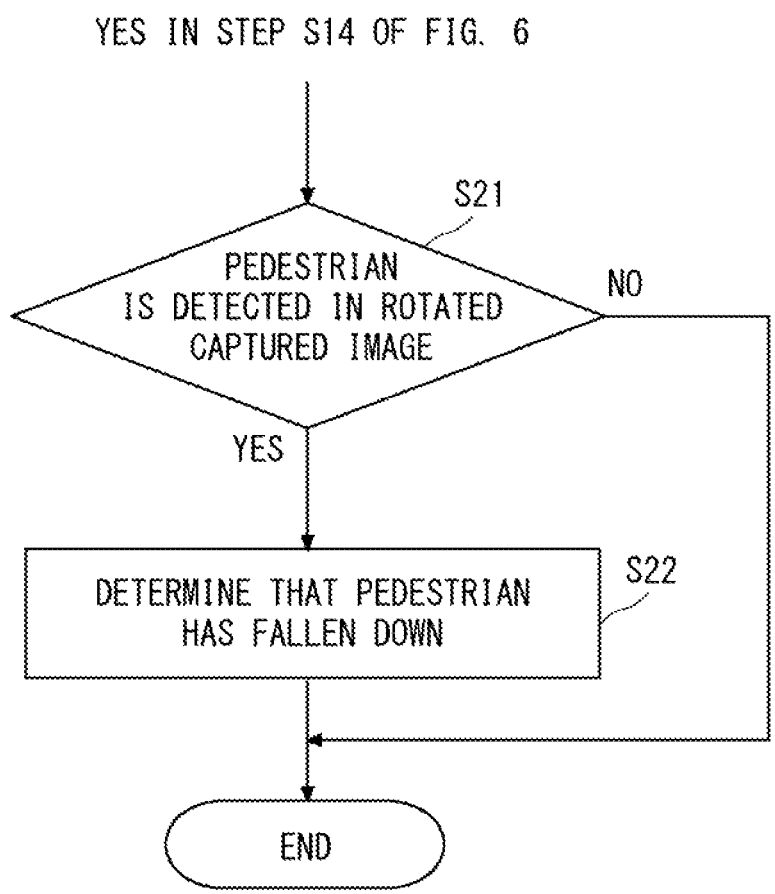
FIG. 7 is a view showing the flow of a process of detecting a person who has fallen down according to a third example embodiment.

A process of detecting a pedestrian according to a third example embodiment is described hereinafter with reference to FIG. 7. FIG. 7 shows a process after the determination unit 22 determines YES in Step S14 of FIG. 6. The state where the determination unit 22 determines YES in Step S14 of FIG. 6 is the state where the pedestrian is not detected in the captured image and the object 40 is detected only by the laser beam in the fourth layer.

In this state, the determination unit 22 rotates the captured image in which the pedestrian is not detected and then tries to detect the pedestrian. When the determination unit 22 carries out learning of a pedestrian by using deep learning, the standing posture of the pedestrian is mainly learned. Therefore, the determination unit 22 becomes unable to detect the pedestrian in the state where the pedestrian has fallen down.

Thus, by rotating the captured image, the determination unit 22 makes the state of the pedestrian who is falling down closer to the state of standing. Further, the determination unit 22 applies the learning model whose input is the rotated captured image and which has learned the standing posture of the pedestrian, and thereby tries to detect the pedestrian. For example, the determination unit 22 may rotate the captured image by 90 degrees or by 90±α (α is any positive value) degrees.

When the pedestrian is not detectable in the rotated captured image, the determination unit 22 may rotate the captured image again, and may rotate the captured image a plurality of times until the pedestrian is detected. When the pedestrian is detected before reaching a predetermined number of rotations, the determination unit 22 determines that the pedestrian has fallen down (S22). When, on the other hand, the pedestrian is not detected before reaching a predetermined number of rotations, the determination unit 22 ends the process.

As described above, the information processing device 20 according to the third example embodiment is able to detect a pedestrian who has fallen down by using a rotated captured image. This improves the accuracy of determining whether the object 40 detected by the LiDAR sensor 10 is a pedestrian who has fallen down.

Further, the case where the determination unit 22 becomes unable to detect a pedestrian in a captured image includes the case where the pedestrian simply walks away from the surveillance area 60. If the determination unit 22 tries to detect a pedestrian by rotating a captured image in this case causes an increase in processing load of the information processing device 20.

In the third example embodiment, the determination unit 22 tries to detect a pedestrian by rotating a captured image when the object 40 is detected by the laser beam in the fourth layer in the case where the pedestrian becomes not detectable in the captured image. This allows reducing the cases of trying to detect a pedestrian by rotating a captured image compared with when not using information of a laser beam. As a result, in the third example embodiment, an increase in processing load is suppressed compared with the case of trying to detect a pedestrian by rotating a captured image in all cases when the pedestrian becomes not detectable in the captured image.

Figure 8:
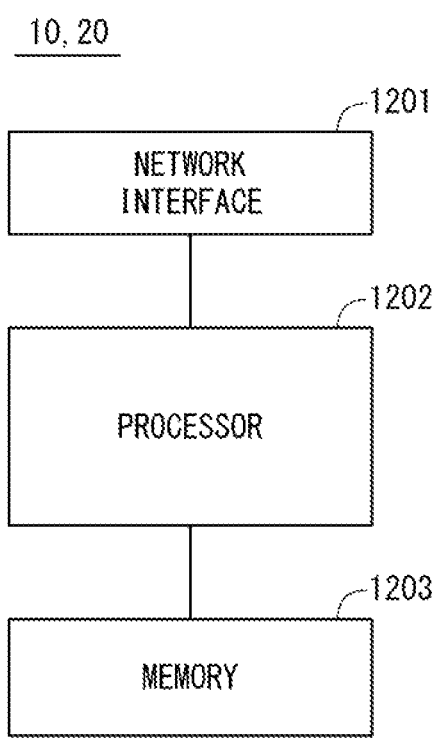
FIG. 8 is a block diagram of an information processing device according to each example embodiment.

FIG. 8 is a block diagram showing a configuration example of the information processing device 20. Referring to FIG. 8, the information processing device 20 includes a network interface 1201, a processor 1202, and a memory 1203. The network interface 1201 is used to communicate with another network node that constitutes the communication system. The network interface 1201 may be used to perform radio communication. For example, the network interface 1201 may be used to perform wireless LAN communication defined by IEEE 802.11 series or mobile communication defined by 3GPP (3rd Generation Partnership Project). Alternatively, the network interface 1201 may include a network interface card (NIC) that complies with the IEEE 802.3 series, for example.

The processor 1202 reads and runs software (computer program) from the memory 1203 and thereby executes processing of the information processing device 20 that is described with reference to the flowchart or the sequence chart in the example embodiments described above. The processor 1202 may be a microprocessor, an MPU (Micro Processing Unit) or a CPU (Central Processing Unit), for example. The processor 1202 may include a plurality of processors.

The memory 1203 is a combination of a volatile memory and a nonvolatile memory. The memory 1203 may include a storage that is placed apart from the processor 1202. In this case, the processor 1202 may access the memory 1203 through an I/O interface, which is not shown.

In the example of FIG. 8, the memory 1203 is used to store a group of software modules. The processor 1202 performs the processing of the information processing device 20 described in the above example embodiments by reading the group of software modules from the memory 1203 and executing them.

As described with reference to FIG. 8, each of processors included in the information processing device 20 runs one or a plurality of programs including a group of instructions for causing a computer to perform the algorithms described using the drawings.

In the above-described examples, the program can be stored and provided to a computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Note that the present disclosure is not limited to the above-described example embodiments and can be modified as appropriate without departing from the spirit and scope of the present disclosure. Further, the present disclosure may be implemented by combining the above-described example embodiments with one another.

The whole or part of the example embodiments disclosed above can be described as, but not limited to, the following supplementary notes.

(Supplementary Note 1)
A surveillance system comprising:
a LiDAR sensor configured to emit a plurality of laser beams with different ranges to a surveillance area, and output a detection signal indicating a detection status of an object by each of the laser beams; and
an information processing device configured to determine that the object has fallen down when the detection status by a laser beam with a shorter range than a predetermined range indicates that the object is detected and the number of laser beams detecting the object decreases.

(Supplementary Note 2)
The surveillance system according to Supplementary note 1, wherein the information processing device determines that the object has fallen down when the detection signal by the laser beam with the shortest range among the plurality of laser beams detects the object.

(Supplementary Note 3)
The surveillance system according to Supplementary note 1 or 2, wherein the LiDAR sensor controls an illumination direction of the plurality of laser beams so that the plurality of laser beams reach an earth's surface inside the surveillance area.

(Supplementary Note 4)
The surveillance system according to any one of Supplementary notes 1 to 3, further comprising:
a camera configured to capture an image of the surveillance area,
wherein the information processing device recognizes the object in a captured image captured using the camera, and determines that the object has fallen down when the object becomes not recognized in the captured image where the object has been recognized.

(Supplementary Note 5)
The surveillance system according to Supplementary note 4, wherein the information processing device determines that the object has fallen down when timing when the number of laser beams detecting the object decreases and timing when the object becomes not recognized in the captured image where the object has been recognized are within a predetermined range.

(Supplementary Note 6)
The surveillance system according to Supplementary note 4 or 5, wherein the information processing device rotates the captured image where the object becomes not recognized, and determines that the object has fallen down when the object becomes recognized in the captured image by using the rotated captured image and a learning model having learned a standing state of a person.

(Supplementary Note 7)

An information processing device comprising:
a communication unit configured to receive, from a LiDAR sensor having emitted a plurality of laser beams with different ranges to a surveillance area, a detection signal indicating a detection status of an object by each of the laser beams; and
a determination unit configured to determine that the object has fallen down when the detection status by a laser beam with a shorter range than a predetermined range indicates that the object is detected and the number of laser beams detecting the object decreases.

(Supplementary Note 8)

The information processing device according to Supplementary note 7, wherein the determination unit determines that the object has fallen down when the detection signal by the laser beam with the shortest range among the plurality of laser beams detects the object.

(Supplementary Note 9)

A fall detection method comprising:
receiving, from a LiDAR sensor having emitted a plurality of laser beams with different ranges to a surveillance area, a detection signal indicating a detection status of an object by each of the laser beams; and
determining that the object has fallen down when the detection status by a laser beam with a shorter range than a predetermined range indicates that the object is detected and the number of laser beams detecting the object decreases.

(Supplementary Note 10)

A non-transitory computer readable medium storing a program causing a computer to execute:
receiving, from a LiDAR sensor having emitted a plurality of laser beams with different ranges, a detection signal indicating a detection status of an object by each of the laser beams; and
determining that the object has fallen down when the detection status by a laser beam with a shorter range than a predetermined range indicates that the object is detected and the number of laser beams detecting the object decreases.

Note that the present disclosure is not limited to the above-described example embodiments and can be modified as appropriate without departing from the spirit and scope of the present disclosure.

REFERENCE SIGNS LIST

10 LiDAR SENSOR
11 ILLUMINATION UNIT
12 COMMUNICATION UNIT
20 INFORMATION PROCESSING DEVICE
21 COMMUNICATION UNIT
22 DETERMINATION UNIT
30 NETWORK
40 OBJECT
50 EARTH'S SURFACE
60 SURVEILLANCE AREA
70 CAMERA

What is claimed is:

1. A surveillance system comprising:
a camera configured to capture an image of a surveillance area,
a LiDAR sensor; and
an information processing device;
wherein the LiDAR sensor comprises;
at least one memory storing instructions, and
at least one processor configured to execute the instructions to;
emit a plurality of laser beams with different ranges to the surveillance area, and output a detection signal indicating a detection status of an object by each of the laser beams; and
wherein the information processing device comprises;
at least one memory storing instructions, and
at least one processor configured to execute the instructions to;
determine that the object has fallen down when the detection status by a laser beam with a shorter range than a predetermined range indicates that the object is detected and the number of laser beams detecting the object decreases,
recognize the object in a captured image captured using the camera, and
determine that the object has fallen down when timing when the number of laser beams detecting the object decreases and timing when the object becomes not recognized in the captured image where the object has been recognized are within a predetermined range.

2. The surveillance system according to claim 1, wherein the at least one processor of the information processing device is further configured to execute the instructions to determine that the object has fallen down when the detection signal by the laser beam with the shortest range among the plurality of laser beams detects the object.

3. The surveillance system according to claim 1, wherein the at least one processor of the LiDAR sensor is further configured to execute the instructions to control an illumination direction of the plurality of laser beams so that the plurality of laser beams reach an earth's surface inside the surveillance area.

4. The surveillance system according to claim 1, wherein the at least one processor of the information processing device is further configured to execute the instructions to rotate the captured image where the object becomes not recognized, and determine that the object has fallen down when the object becomes recognized in the captured image by using the rotated captured image and a learning model having learned a standing state of a person.

5. A fall detection method comprising:
receiving, from a LiDAR sensor having emitted a plurality of laser beams with different ranges to a surveillance area, a detection signal indicating a detection status of an object by each of the laser beams;
recognizing the object in a captured image captured using a camera; and
determining that the object has fallen down when the detection status by a laser beam with a shorter range than a predetermined range indicates that the object is detected and the number of laser beams detecting the object decreases and when timing when the number of laser beams detecting the object decreases and timing when the object becomes not recognized in the captured image where the object has been recognized are within a predetermined range.

6. A non-transitory computer readable medium storing a program causing a computer to execute:
   receiving, from a LiDAR sensor having emitted a plurality of laser beams with different ranges to a surveillance area, a detection signal indicating a detection status of an object by each of the laser beams;
   recognizing the object in a captured image captured using a camera; and
   determining that the object has fallen down when the detection status by a laser beam with a shorter range than a predetermined range indicates that the object is detected and the number of laser beams detecting the object decreases and when timing when the number of laser beams detecting the object decreases and timing when the object becomes not recognized in the captured image where the object has been recognized are within a predetermined range.

* * * * *